March 10, 1959 F. SIMON ET AL 2,877,307
CONTROLLING THE EXTENSION OF CALLS IN P. B. X TELEPHONE SYSTEM
Filed Nov. 30, 1954
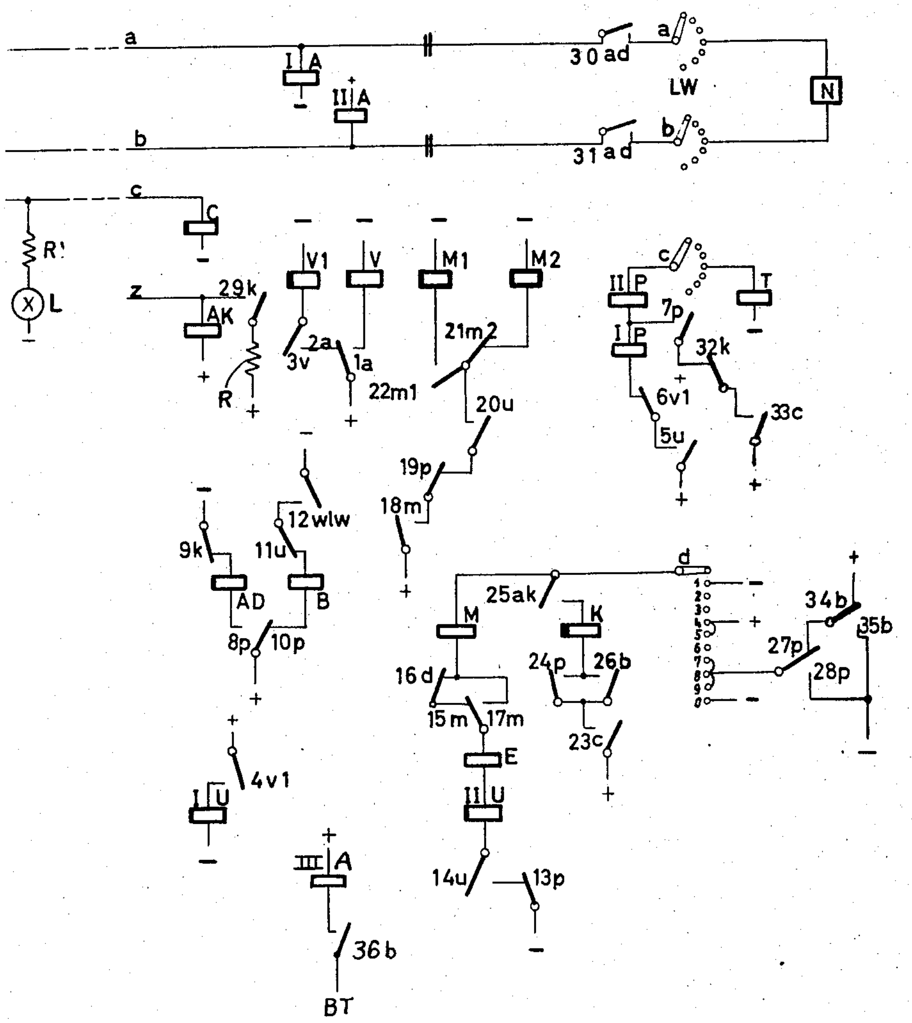
Inventors.
Franz Simon, &,
Walter Grohmann.
By. [signature] Atty.

United States Patent Office 2,877,307 Patented Mar. 10, 1959

2,877,307

CONTROLLING THE EXTENSION OF CALLS IN P. B. X TELEPHONE SYSTEM

Franz Simon and Walter Grohmann, Munich, Germany, assignors to Siemens & Halske Aktiengesellschaft, Munich and Berlin, Germany, a German corporation Application November 30, 1954, Serial No. 472,188

Claims priority, application Germany December 11, 1953

3 Claims. (Cl. 179—23)

This invention relates to communication systems and is particularly concerned with a private branch exchange (P. B. X) telephone system comprising connectors for extending calls to lines or stations having different service requirements, for example, the usual stations with consecutive lines and stations authorized to make certain calls such, for example, as outside calls.

There are systems known having connectors comprising a wiper for determining the service-type of called stations and for preventing completion of outside calls to stations which are not entitled to such service.

The object of the invention is to provide simple means for accomplishing over a wiper of the connector the service-type marking of stations to be called and also the control of the connector in extending calls to stations of the consecutive line type.

The above noted and other objects and features of the invention will appear from the description of an embodiment which is rendered below with reference to the accompanying diagrammatic drawing.

Inter-office calls as well as outside calls and calls to stations of the consecutive line type are extended over a connector LW which is provided with four wipers marked *a*—*b*—*c*—*d*. In the illustrated example, a station not entitled to outside calls is provided with a bank contact 1 accessible to the wiper *d*, such contact carrying battery (—) marking potential.

Contacts 2 and 3 are associated with individual lines which are entitled to receive outside calls, such contacts being likewise accessible to the wiper *d* and carrying no potential.

Contacts 4 to 6 belong to a group of consecutive line stations which are entitled to outside calls. The contacts 4 and 5 carry ground (+) potential, the wiper *d*, stepping over these contacts, reaching the position or contact 6 carrying no potential.

Bank contacts 7 to 0 are associated with consecutive line stations not entitled to receive outside calls. Contacts 7 to 9 carry for the stepping control of the connector LW to these stations ground (+) potential over contacts 27*p* and 34*b* in normal position, such contacts being respectively controlled by relays P and B. Battery (—) potential may be connected to the bank contacts 7 to 9 over circuits extending respectively over contacts 28*p* and 27*p*/35*b* for the purpose of carrying out the service authorization testing. The last bank contact 0 of the corresponding consecutive line group carries minus (—) potential to mark the service authorization.

Upon seizure of the connector LW by a calling P. B. X line, relay C will be energized over conductor *c* and line relay A (winding IA and IIA) will be energized over the line conductors *a* and *b*. Upon energizing, relay A closes its contact 1*a* causing energization of relay V in a circuit (1) extending from +, 1*a*, V to —

The dial pulses of the calling line are received by the line relay A, it being assumed that the call is to be extended to an individual line, and the pulses accordingly produced by the relay A are in suitable known manner (not shown) transmitted to the coils M1 and M2 of the stepping motor. Relay V1 is energized during the transmission of an impulse series in a circuit (2) from +, 2*a*, 3*v*, V1 to —

Upon energizing, relay V1 closes a circuit for the energization of relay U, which extends (3) from +, 4*v*1, winding IU to —

Relay VI deenergizes upon completion of the stepping operation, opening the circuit for relay U; during the deenergization interval of relay U, a test circuit is completed over the wiper *c* which extends (4) from +, 5*u*, 6*v*1, IP, IIP, wiper *c*, T to —

If the called line N is idle, the test relay P will energize, completing the circuit (5) from +, 33*c*, 32*k*, 7*p*, IIP, wiper *c*, T to —

Upon actuating, relay P completes a circuit for the energization of the switching-through relay AD which extends (6) from +, 8*p*, AD, 9*k* to —

Relay AD closes its contacts 30*ad* and 31*ad*, thus extending the line conductors over the switch wipers *a* and *b*. Ringing is now applied to the called line N and the connection is completed, all in known not illustrated manner.

Assuming the line N to be busy, the test relay P cannot energize in the circuit (4) traced above. Relay U deenergizes upon termination of the testing interval and the busy relay B is connected in a circuit (7) from +, 10*p*, B, 11*u*, off normal contact 12*w*1*w* to —

Upon energizing, relay B closes its contact 36*b* to connect busy tone BT to winding III of relay A from which the tone is inductively transmitted to the windings I and II (IA and IIA) and thence over line conductors *a* and *b* to the calling line.

If it is assumed that the calling line has dialled a line in the consecutive line group comprising the bank contacts 4 to 6, and further that the first line associated with the contact 4 is idle, the relay P will energize in the circuits (4) and (5) and the relay AD will energize in the circuit (6), thus switching the call through to the first line of the consecutive line group.

However, if the first line in this group is busy, the test relay P will not energize during the test interval and a circuit is completed over the switch wiper *d* which extends (8) from +, wiper *d* in position 4, M, 16*d*, 15*m*, E, IIU, 14*u*, 13*p* to —

Relay U is maintained energized in this circuit and relay M is caused to energize. The latter relay continues to hold over its contact 17$m$ and reconnects the coils M2/M1 of the stepping motor in a circuit (9) from +, 18$m$, 19$p$, 20$u$, 21$m$2, M2 to −

The stepping motor upon operation, opens contact 21$m$2 and thereafter closes contact 21$m$1, connecting over the latter contact the winding M1. The wipers are thereby stepped to the bank contacts 5 associated with the next consecutive line. If this latter line is also found busy, relay M will remain energized and will cause the connector to step its wipers to position 6. If this position is idle, the circuits (4) to (6) will become operative and the call will be completed to the corresponding consecutive line.

In case such line, being the last in this group, is busy, the relays U and M will deenergize because there is no ground (+) potential on the bank contact 6 now engaged by wiper $d$, and the busy relay B will be energized in the circuit (7) as and for the purpose described before.

In case of an incoming call from an outside exchange, relay AK will be energized over the conductor $z$, thus furnishing a criterion marking the outside call. Relay AK initiates the testing for the service authorization. Relays C and A are energized as before. Relay V energizes in the circuit (1).

Assuming that the outside call is extended to the line associated with bank contact 1, which is not authorized to receive outside calls, and if such line is idle, relay K will be energized over the switch wiper $d$, after energization of relay P, in the circuit

(10) from +, 23$c$, 24$p$, K, 25$ak$, $d$ in position 1 to −

Upon operating, relay K connects at its contact 29$k$ ground to conductor $z$ over resistor R extending in parallel to relay AK, thereby increasing the potential on conductor $z$ to cause actuation of a signal lamp L in a circuit over resistor R1 disposed at the P. B. X switchboard so to inform the operator that an outside call had been extended to an unauthorized P. B. X line. Relay K also opens the circuit (6), preventing energization of the relay AD and consequently switching through of the line conductor $a$ and $b$ at contacts 30$ad$/31$ad$. The switchboard operator frees the connector by effecting release of the relays A and C.

In the event that the line associated with the bank contact 1 is busy, the test relay P will not be energized in circuit (4) but relay B will energize in the circuit (7). The service authorization test is in such busy condition of the called P. B. X line effected over a circuit including the relay K and contact 26$b$. Relay K energizes and a signal is again transmitted to the P. B. X switchboard operator so as to inform her of the attempt to extend an outside call to an unauthorized line.

If the connector is actuated by manipulations of the P. B. X operator, to connect with an authorized individual line 2 or 3 or with an authorized consecutive line 4, 5 or 6, the energization of the relay K will be prevented due to the absence of potential on contacts 2, 3 and 6 and presence on ground (+) potential on contacts 4 and 5, respectively. The previously described switching operations governing the idle or the busy conditions of such lines will thereupon be effected as explained before.

If the connector is by the P. B. X switchboard operator caused to connect with the first line 7 of the group of unauthorized consecutive lines, and if such line is busy, a circuit will be completed for the relays U and M which extends

(11) from +, 34$b$, 27$p$, wiper $d$ in position 7, M, 16$d$, 15$m$, E, IIU, 14$u$, 13$p$ to −

Relay U is maintained energized in such circuit to prolong the test interval of the connector.

Relay M closes its contact 18$m$ to complete the circuit (9) for the actuation of the coils M2/M1 of the stepping motor. The connector accordingly advances its wipers to the line associated with contact 8. In case the corresponding line is also busy, the relays U and M will remain actuated and the connector steps its wipers to the bank contacts of the line associated with contact 9.

If this last noted line 9 is idle, the relay P will energize in circuit (4). Circuit (5) will thereupon become effective and the switching-through relay will be actuated in accordance with circuit (6). At contact 28$p$, the relay P connects minus (−) potential to the bank contacts 7 to 9.

The service authorization test now becomes operative. Since the consecutive lines 7 to 9 are unauthorized for receiving outside calls, the relay K will become energized in the circuit

(12) from +, 23$c$, 24$p$, K, 25$ak$, wiper $d$ in position 9, 28$p$ to −

Upon energizing, relay K closes its contact 29$k$ and the previously described signal is again transmitted to the P. B. X switchboard operator. The circuit (5) is opened at contact 32$k$. The relay P deenergizes. The relay B energizes in the circuit (7). A circuit is now closed for the relay K which extends

(13) from +, 23$c$, 26$b$, K, 25$ak$, wiper $d$ in position 9, 27$p$, 35$b$ to −

In case line 9 of this consecutive line group is found busy, the connector will step to the position 0 in which it stops due to absence of ground potential whether the corresponding line is busy or idle. If such line is idle, the service authorization test will be carried out by relay K over contact 24$p$ and bank contact 0; if the line is busy, relay B will be energized and will cause transmission of the busy tone after release of relay U. The service authorization test by relay K is thereupon effected over contact 26$b$ and bank contact 0 and relay K initiates the pertinent switching operations already described.

Changes may be made within the scope and spirit of the appended claims.

We claim:

1. In a private branch exchange telephone system, a connector for extending calls to individual lines authorized to receive outside calls and to lines of consecutive line groups containing lines unauthorized to receive outside calls and also containing lines authorized to receive outside calls, means for operating said connector to connect its wipers with bank contacts associated with lines of either service type, said bank contacts including control bank contacts carrying distinctive different potentials respectively characteristic of authorized and unauthorized lines, a control wiper for establishing connection with said control bank contacts, a stepping control relay, circuit means for connecting said stepping control relay with said control test wiper incident to extending a call to a consecutive line group upon setting of said control wiper in engagement with the first control bank contact in such group, means controlled by said stepping control relay for causing said connector to step its wipers sequentially over the bank contacts associated with busy lines in said consecutive line group, an authorization test relay, an authorization test control relay, means for actuating said authorization test control relay only incident to operating said connector to extend an incoming outside call to a line, means controlled by said authorization test control relay upon operation thereof to connect said authorization test relay with said control wiper to test the potential criterion on the control bank contact engaged thereby, means controlled by said authorization test relay upon operation thereof to prevent completion of the corresponding call, and means also controlled by such relay for transmitting a signal to the private branch exchange switchboard to characterize such call as an unauthorized call.

2. The structure and cooperation of parts as defined in claim 1, comprising a relay for testing the idle or busy condition of a called line, said relay energizing when a called line is found idle, and means also controlled by said authorization test relay upon operation thereof for releasing said last named test relay upon setting said connector to extend the corresponding call to an unauthorized idle line.

3. The structure and cooperation of parts as defined in claim 2, comprising means for thereupon actuating a signal relay to transmit busy tone to the calling outside line.

References Cited in the file of this patent

UNITED STATES PATENTS

| | | |
|---|---|---|
| 2,490,036 | Deakin | Dec. 6, 1949 |
| 2,651,681 | Borel et al. | Sept. 8, 1955 |
| 2,707,727 | Pharis | May 3, 1955 |
| 2,748,195 | Faber | May 29, 1956 |